United States Patent [19]
Daimon et al.

[11] Patent Number: 5,545,733
[45] Date of Patent: Aug. 13, 1996

[54] METHOD FOR PREPARING HYDROXYGALLIUM PHTHALOCYANINE CRYSTALS AND ELECTROPHOTOGRAPHIC PHOTORECEPTOR USING THE CRYSTALS

[75] Inventors: Katsumi Daimon; Katsumi Nukada; Yasuo Sakaguchi; Ryosaku Igarashi, all of Minami-ashigara, Japan

[73] Assignee: Fuji Xerox Co., Ltd., Tokyo, Japan

[21] Appl. No.: 288,079

[22] Filed: Aug. 10, 1994

[30] Foreign Application Priority Data

Aug. 12, 1993 [JP] Japan .................................. 5-219194

[51] Int. Cl.⁶ .................................................. C09B 47/04
[52] U.S. Cl. ........................... 540/139; 540/140; 540/141
[58] Field of Search ..................................... 540/141, 139, 540/140

[56] References Cited

U.S. PATENT DOCUMENTS

| | | | |
|---|---|---|---|
| 2,770,629 | 11/1956 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 96/1.5 |
| 5,302,479 | 4/1994 | Daimon et al. | 430/78 |
| 5,360,475 | 11/1994 | Nukada et al. | 540/139 |

FOREIGN PATENT DOCUMENTS

| | | |
|---|---|---|
| 48-34189 | 5/1973 | Japan . |
| 49-105536 | 10/1974 | Japan . |
| 50-38543 | 4/1975 | Japan . |
| 57-148745 | 9/1982 | Japan . |
| 58-21416 | 2/1983 | Japan . |
| 59-133551 | 7/1984 | Japan . |
| 60-59354 | 4/1985 | Japan . |
| 61-151659 | 7/1986 | Japan . |
| 1-221459 | 9/1989 | Japan . |
| B2-3-30854 | 5/1991 | Japan . |
| 5-263007 | 10/1993 | Japan . |
| 2255980 | 11/1992 | United Kingdom ............ 540/141 |

OTHER PUBLICATIONS

"CHIMIE DES COMPLEXES—Sur quelques dérivés de la phtalocyanine" (COLAÏTIS), Académie de Sciences (1956), p. 1026.
"Studies of a series of Haloaluminum, –gallium, and –indium Phthalocyanines[1]" John P. Linsky et al., *Inorg.Chem.* 1980, 19, pp. 3131–3135.
"No. 2–Etude de quelques derives de la phtalocyanine discussion des divers modes d'obtention, I.—Phtalocyanines de'elements de valence superieure a deux." Mme. D. Colaitis, *Bull. Soc. Chim.* France (1962) pp. 23–26.

*Primary Examiner*—Mukund J. Shah
*Assistant Examiner*—Pavanaram K. Sripada
*Attorney, Agent, or Firm*—Oliff & Berridge

[57] ABSTRACT

A method for preparing hydroxygallium phthalocyanine crystals wherein hydroxygallium phthalocyanine crystals having distinct diffraction peaks at 7.0°, 13.4°, 16.6°, 26.0° and 26.7° of the Bragg angle (2θ±0.2°) with respect to CuKα characteristics X-ray in the X-ray diffraction spectrum are crystal-transferred by solvent treatment. The crystals after crystal-transfer have distinct diffraction peaks at (i) 7.7°, 16.5°, 25.1° and 26.6°, (ii) 7.9°, 16.5°, 24.4° and 27.6°, (iii) 7.0°, 7.5°, 10.5°, 11.7°, 12.7°, 17.3°, 18.1°, 24.5°, 26.2° and 27.1, (iv) 7.5°, 9.9°, 12.5°, 16.3°, 18.6°, 25.1° and 28.8° or (v) 6.8°, 12.8°, 15.8° and 26.0° of the Bragg angle (2θ±0.2° C.) with respect to CuKα characteristics X-ray in the X-ray diffraction spectrum. An electrophotographic photoreceptor having a light-sensitive layer on a electroconductive substrate wherein the light-sensitive layer contains at least one of the hydroxygallium phthalocyanine crystals.

14 Claims, 4 Drawing Sheets

METHOD FOR PREPARING HYDROXYGALLIUM PHTHALOCYANINE CRYSTALS AND ELECTROPHOTOGRAPHIC PHOTORECEPTOR USING THE CRYSTALS

FIELD OF THE INVENTION

The present invention relates to a method for preparing hydroxygallium phthalocyanine crystals useful as photoconductive materials and an electrophotographic photoreceptor using the crystals.

Phthalocyanine compounds are useful as materials for paint compositions, printing inks and catalysts and as electronic materials and, in particular, they have been broadly investigated as materials for electrophotographic photoreceptors, materials for optical recording and materials for photo-electric conversion in these days.

Regarding electrophotographic photoreceptors, recently, the demand for extending the light-sensitive wavelength range of organic photoconductive materials which have heretofore been proposed up to the near infrared wavelength range of semiconductor lasers (780 to 830 nm) so as to use the materials as a photoreceptor for digital recording system such as a laser printer. From the view point, squalilium compounds (as disclosed, e.g., in JP-A-49-105536 and JP-A-58-21416), triphenylamine trisazo compounds (as disclosed, e.g., in JP-A-61-151659) and phthalocyanine compounds (as disclosed, e.g., in JP-A-48-34189 and JP-A-57-148745) have been proposed as photoconductive materials for semiconductor lasers. (the term 'JP-A' as used herein means as 'unexamined published Japanese patent application')

Where organic photoconductive materials are used as light-sensitive materials for semiconductor lasers, they are needed to satisfy the conditions that the light-sensitive wavelength range is extended up to a long wavelength range and that the sensitivity and durability of the photoreceptors to be formed therefrom are good. The above-mentioned organic photoconductive materials do not sufficiently meet the conditions.

In order to overcome various drawbacks, the above-mentioned organic photoconductive materials have been investigated with respect to the relationship between the crystal form and the electrophotographic characteristics. In particular, many reports relating to phothalocyanine compounds have heretofore been disclosed.

In general, it is known that phthalocyanine compounds have various crystal forms, depending upon the difference in the manufacture method and treating method, and that the difference in the crystal form has a great influence on the photo-electric conversion characteristics of phthalocyanine compounds. Regarding crystal forms of phthalocyanine compounds, for example, with respect to copper phthalocyanine, various crystal forms such as α, π, χ, ρ, γ and δ are known in addition to a stable crystal form of β (as described, e.g., in U.S. Pat. Nos. 2,770,629, 3,160,635, 3,708,292 and 3,357,989). Publications such as JP-A-50-38543 describe the relationship between difference of crystal forms of copper phthalocyanine and the elctrophotographic sensitivity.

Regarding the crystal forms of hydroxygallium phthalocyanine obtained by an acid-pasting method and the electrophotographic characteristics of them using, JP-A-1-221459 mentions two kinds of crystals. In addition, the inventors have found that the five kinds of crystal forms described in Japanese Patent Application No. 4-118524 have excellent electrophotographic characteristics. Regarding the method for preparing these crystals, acid-pasting methods as described in Bull. Soc. Chim. France, 23 (1962) may be adopted. The resulting metastable hydroxygallium phthalocyanine is treated with a solvent to be exchanged to obtain the hydroxygallium phthalocyanine.

When hydroxygallium phthalocyanine is prepared by a conventional acid-pasting, crystals having the same crystal forms may be obtained. However, where the obtained crystals are used as an electrophotographic photoreceptor, scatters of characteristics, in particular, charge retentiveness and dark damping factors are wide. Thus it was difficult to obtain crystals having stable characteristics.

The present invention has been made in view of the above-mentioned situation.

SUMMARY OF THE INVENTION

One object of the present invention is to provide a method for preparing hydroxygallium phthalocyanine crystals having stable characteristics as photoconductive materials.

Further object of the present invention is to provide an electrophotographic photoreceptor having high sensitivity characteristics and durability using the crystals as a photoconductive material.

As a result of earnest investigations, the present inventors have found that stable hydroxygallium phthalocyanine crystals can be obtained by solvent treatment of hydroxygallium phthalocyanine crystals having distinct diffraction peaks of the specific Bragg angles in the X-ray diffraction spectrum and they have completed the present invention.

Accordingly, the present invention provides a method for preparing hydroxygallium phthalocyanine crystals wherein hydroxygallium phthalocyanine crystals having distinct diffraction peaks at 7.0°, 13.4°, 16.6°, 26.0° and 26.7° of the Bragg angle (2θ±0.2°) with respect to CuKα in the X-ray diffraction spectrum are crystal-transferred by solvent treatment.

DETAILED DESCRIPTION OF THE INVENTION

The hydroxygallium phthalocyanine crystals used in the present invention have distinct diffraction peaks at 7.0°, 13.4°, 16.6°, 26.0° and 26.7° of the Bragg angle (2θ±0.2°) with respect to CuKα characteristic X-ray in the X-ray diffraction spectrum and may be synthesized by a method in which acid-paste solution containing gallium phthalocyanine is added to into a mixed solution of alkaline aqueous solution and organic solvent. Although impurities in the phthalocyanine have effect on the electrophotographic characteristics, the hydroxygallium phthalocyanine crystals having the above-mentioned crystal form are obtained by adding acid-paste solution in a mixed solution containing organic solvent in the present invention and thus the impurities are dissolved in the organic solvent to obtain hydroxygallium phthalocyanine in which the impurities content is decreased, compared to the case using the conventional methods in which acid-paste solution is added into $H_2O$ alone. Accordingly, it can be estimated that hydroxygallium phthalocyanine crystals having stable characteristics may be obtained since crystal-transfer is carried out by solvent treatment using them.

The method for preparing the crystals will be detailed hereinafter.

The gallium phthalocyanine used as a starting material to obtain hydroxygallium phthalocyanine crystals used in the present invention may include chlorogallium phthalocyanine, bromogallium phthalocyanine, iodogallium phthalocyanine, but the ligand on gallium is not limited. In addition, these gallium phthalocyanines may be synthesized by a conventional method. Any kinds of methods such as synthesis of chlorogallium phthalocyanine, as described in D. C. R. Acad. Sci., (1956), 242, 1026, Japanese Patent Publication No.3-30854, JP-A-No.1-221459 and Inorg. Chem.(1980), 19, 3131; synthesis of bromogallium phthalocyanine, as described in JP-A-No. 59-133551; and synthesis of bromogallium phthalocyanine, as described in JP-A-No.60-59354. The gallium phthalocyanines may be synthesized by using gallium trialcoxide or the like.

Then the gallium phthalocyanine is treated by an acid-pasting method in which an acid-paste solution of gallium phthalocyanine is added into a mixed solution of an alkaline aqueous solution and an organic solvent to carry out acid-pasting. The organic solvent used may include alcohols such as methanol, glycols such as ethylene glycol, glycerin and polyethylene glycol; ketones such as acetone and methylethylketone; esters such as ethyl acetate and butyl acetate; hydrocarbon halide such as dichloromethane and chloroform and aromatic hydrocarbons such as toluene and xylene. The organic solvent amount is in the range from 1/10 to 10 times, preferably in the range from 1/2 to 5 times as much as water. The temperature of the acid-pasting is in the range from −15° C. to 100° C. but the temperature at a boiling point of the mixed solution or less is preferable. The alkalis used may include sodium hydroxide, potassium hydroxide, sodium carbonate, potassium carbonate, ammonia, and various ammonium hydroxides. The mixed solution is used in the range from 1 to 100 times, preferably in the range from 3 to 20 times as much as the acid-paste solution of gallium phthalocyanine. The acid used in the acid-paste solution may include sulfuric acid, hydrochloric acid, hydrobromic acid and trifluoro acetic acid, conc. sulfuric acid being preferable because the solubility thereof is high and easy to handle. In the case of conc. sulfuric acid, it is used in the range from 5 to 100 times as much as gallium phthalocyanine, however, 15 to 40 times being preferable. The acid-paste solution is added dropwise to a mixed solution of alkaline aqueous solution and organic solvent with stirring and keeping the temperature of the solution at the boiling point or less to obtain hydroxygallium phthalocyanine. The resulting hydroxygallium phthalocyanine crystals are washed with water or the like and purified. Thus hydroxygallium phthalocyanine crystals having distinct diffraction peaks at 7.0°, 13.4°, 16.6°, 26.0° and 26.7° of the Bragg angle (2θ±0.2°) with respect to CuKα characteristic X-ray in the X-ray diffraction spectrum are obtained.

The hydroxygallium phthalocyanine crystals obtained in the above manner is treated by solvent by the present invention. By the treatment, crystal transfer is carried out to obtain the object hydroxygallium phthalocyanine crystals.

The hydroxygallium phthalocyanine crystals obtained by the present invention may include:

The crystals having distinct diffraction peaks at (i) 7.7°, 16.5°, 25.1° and 26.6°, (ii) 7.9°, 16.5°, 24.4° and 27.6°, (iii) 7.0°, 7.5°, 10.5°, 11.7°, 12.7°, 17.3°, 18.1°, 24.5°, 26.2° and 27.1°, (iv) 7.5°, 9.9°, 12.5°, 16.3°, 18.6°, 25.1° and 28.3°, and (v) 6.8°, 12.8°, 15.8° and 26.0° of the Bragg angle (2θ±0.2° C.) with respect to CuKα characteristic X-ray in the X-ray diffraction spectrum.

Examples of the solvents used in the above solvent treatment include the following compounds:

1) Examples of the solvents used for preparing hydroxygallium phthalocyanine crystals having distinct diffraction peaks at 7.7°, 16.5°, 25.1° and 26.6° of the Bragg angle (2θ±0.2° C.) with respect to CuKα characteristic X-ray in the X-ray diffraction spectrum include alcohols (e.g., methanol, ethanol), polyols (e.g., ethylene glycol, glycerin, polyethylene glycol), sulfoxides (e.g., dimethyl sulfoxide) and aromatic compounds (e.g., toluene, chlorobenzene).

2) Examples of the solvents used for preparing hydroxygallium phthalocyanine crystals having, distinct diffraction peaks at 7.9°, 16.5°, 24.4° and 27.6° of the Bragg angle (2θ±0.2° C.) with respect to CuKα characteristic X-ray in the X-ray diffraction spectrum include amides (e.g., N,N-dimethylformamide, N,N,-dimethylacetamide, N-methylpyrrolidone), organic amines (e.g., pyridine, piperidine) and sulfoxides (e.g., dimethylsulfoxide).

3) Examples of the solvents used for preparing hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle (2θ±0.2° C.) with respect to CuKα characteristic X-ray in the X-ray diffraction spectrum include aromatic alcohols (e.g., benzyl alcohol).

4) Examples of the solvents used for preparing hydroxygallium phthalocyanine crystals having distinct diffraction peaks at 7.5°, 9.9°, 12.5°, 16.3°, 18.6°, 25.1°, and 28.3° of the Bragg angle (2θ±0.2° C.) with respect to CuKα characteristic X-ray in the X-ray diffraction spectra include amides (e.g., N,N-dimethylformamide, N,N,-dimethylacetamide, N-methylpyrrolidone), esters (e.g., ethyl acetate, n-butyl acetate, iso-amyl acetate) and ketones (e.g., acetone, methyl ethyl ketone, methyl iso-butyl ketone).

5) Examples of the solvents used for preparing hydroxygallium phthalocyanine crystals having distinct diffraction peaks at 6.8°, 12.8°, 15.8° and 26.0° of the Bragg angle (2θ±0.2° C.) with respect to CuKα characteristic X-ray in the X-ray diffraction spectrum pattern include polyols ((e.g., ethylene glycol, glycerin, polyethylene glycol).

The solvent to be used in preparing the above-mentioned hydroxygallium phthalocyanine crystals may be in the form of a mixed solvent comprising two or more different solvents or a mixed solvent comprising one or more different solvents and water.

Such solvent treatment includes, for example, not only ordinary recrystallization treatment, but also treatments such as by washing, wet-grinding, dipping or suspending and stirring.

Regarding the solvent treatment conditions, the amount of the solvent used is generally from 1 to 200 parts, and preferably from 10 to 100 parts, per one part of hdroxygallium phthalocyanine; and the treating temperature is generally from 0° to 150° C., and preferably from room temperature to 100° C. The solvent treatment may be effected in an appropriate vessels under static condition or with stirring. Wet grinding in a ball mill, a mortar, a sand mill, a kneader or an attritor may be effected with the determined solvent. In grinding, inorganic compounds such as sodium chloride or Glauber's salt as well as grinding media such as glass beads, steel beads or alumina beads can be used.

By the above-mentioned solvent treatment, the crystals of hydroxygallium phthalocyanine of the present invention advantageously having better crystallinity and having a more uniform grain size distribution can be obtained.

Electrophotographic photoreceptors using the hydroxygallium phthalocyanine crystals prepared by the above-mentioned method will be detailed hereinafter.

In the photographic photoreceptor of the present invention, the light-sensitive layer may be a single layer or may have a laminated structure composed of a charge generating layer and a charge transporting layer each having a different function. In the latter case, the charge generating layer is composed of the above-mentioned hydroxygallium phthalocyanine crystals and a binder resin.

In the photographic photoreceptor, a light-sensitive layer composed of a charge generating layer and a charge transporting layer formed thereon is preferably coated on a electroconductive support and a subbing layer is preferably provided between the light-sensitive layer and the electroconductive support.

Charge generating layer of the electrophotographic photoreceptor of the present invention can be formed by preparing a coating composition of a dispersion of the above-mentioned hydroxygallium phthalocyanine crystals dispersed in a solution of a binder resin dissolved in an organic solvent, followed by coating the composition onto electroconductive support.

The binder resin used may be selected from wide range of resins such as polyvinyl butyral resins and polyvinyl polyvinyl formal resins. As the solvent dissolving the binder resin, preferred is an organic solvent which does not dissolve subbing layer.

The proportion of the above-mentioned hydroxygallium phthalocyanine crystals to the binder resin generally falls within the range of from 40/1 to 1/20 by weight. For dispersing the hydroxygallium phthalocyanine crystals, any ordinary methods, such as ball mill dispersion method, attritor dispersion method or sand mill dispersion method, can ben employed.

For coating the coating composition, any conventional method may be employed, such as dip coating method, spray coating method, spinner coating method, bead coating method, wire bar coating method, blade coating method, roller coating method, air knife coating method or curtain coating method. The thickness of charge generating layer is generally approximately from 0.05 to 5 μm.

Charge transporting layer of the elctrophotographic photoreceptor of the present invention may be formed by incorporating a charge transporting material such as N,N,'-diphenyl-N,N'-bis-(m-tolyl)benzidine, 4-diethylaminobenzaldehyde- 2,2-diphenylhydrazone and p-(2,2-diphenylvinyl)-N,N-diphenylaniline, into a binder resin.

Charge transporting layer can be formed by preparing a coating composition from the charge transporting material and the binder resin and an organic solvent such as those mentioned above for charge generating layer, followed by coating the resulting coating composition onto charge generating layer by the same means as the above-mentioned coating means. The proportion of the charge transporting material to the binder resin is preferably from 10/1 to 1/5 by weight. The thickness of charge transporting layer is generally approximately from 5 to 50 μm.

Where the light-sensitive layer of the photoreceptor of the present invention has a single layer constitution, the light-sensitive layer is a photoconductive layer comprising the above-mentioned hydroxygallium phthalocyanine crystals as dispersed in a charge transporting material and a binder resin. As the charge transporting material and binder resin, those to be used in preparing a laminate-structure light-sensitive layer can be used. The single-layer photoconductive layer may be formed in the same manner as mentioned above. In these cases, the proportion of the charge transporting material to the binder resin is preferably be approximately from 1/20 to 5/1 by weight; and the proportion of the hydroxygallium phthalocyanine crystals to the charge transporting material is preferably approximately from 1/10 to 10/1 by weight.

As the electroconductive support, any conventional materials for preparing electrophotographic photoreceptors can be employed.

In the present invention, subbing layer containing polyamide resins, polycarbonate resins, zirconium chelate compounds, titanyl chelate compounds or the like may be provided between electroconductive support and the light-sensitive layer in order to prevent injection of any unnecessary charges from electroconductive support to the light-sensitive layer.

The surface of the light-sensitive layer may be coated with protective layer if desired. Protective layer is formed for the purpose of preventing chemical deterioration of charge transporting layer during charging of the laminate-structure light-sensitive layer and of improving the mechanical strength of the light-sensitive layer.

The present invention will be explained in more detail by way of the following examples, which, however, are not intended to restrict the scope of the present invention. Unless otherwise specifically defined, all 'parts' therein are by weight.

Synthesis Example 1

Synthesis of Hydroxygallium phthalocyanine 31.8 parts of phthalonitrile, 10.1 parts of gallium trimethoxide and 150 ml of ethylene glycol were stirred under nitrogen atmosphere at 200° C. for 24 hours, and the product obtained was filtered. Then the product was washed with N,N-dimethylformamide and methanol successively, and dried to give 25.1 parts of gallium phthalocyanine.

2 parts of the obtained gallium phthalocyanine was dissolved in 50 parts of conc. sulfuric acid, dried for two hours and added dropwise onto a mixed solution of 75 ml of ice-cooled distilled water, 75 ml of conc. ammonia aqueous solution and 150 ml of dichloromethane to separate out crystals. The crystals separated was washed with distilled water sufficiently and dried to obtain 1.8 parts of hydroxygallium phthalocyanine. The powder X-ray diffraction spectrum of the crystal was shown in FIG. 1. The crystals have distinct diffraction peaks at 7.0°, 13.4°, 16.6°, 26.0° and 26.7° of the Bragg angle (2θ±0.2°).

Synthesis Example 2

Synthesis of hydroxygallium phthalocyanine 10 parts of gallium trichloride and 29.1 parts of orthophthalonitrile were added to 100 ml of α-chloronaphthalene to react at 200° C. under nitrogen atmosphere for 24 hours, and chlorogallium phthalocyanine crystals produced was separated by filtration. The wet-cake was dispersed in 100 ml of dimethylformamide and heated to 150° C. for 30 minutes with stirring. After filtration, the product was washed with methanol sufficiently and dried to obtain 28.9 parts (82.5%) of chlorogallium phthalocyanine crystals.

Figure 1:
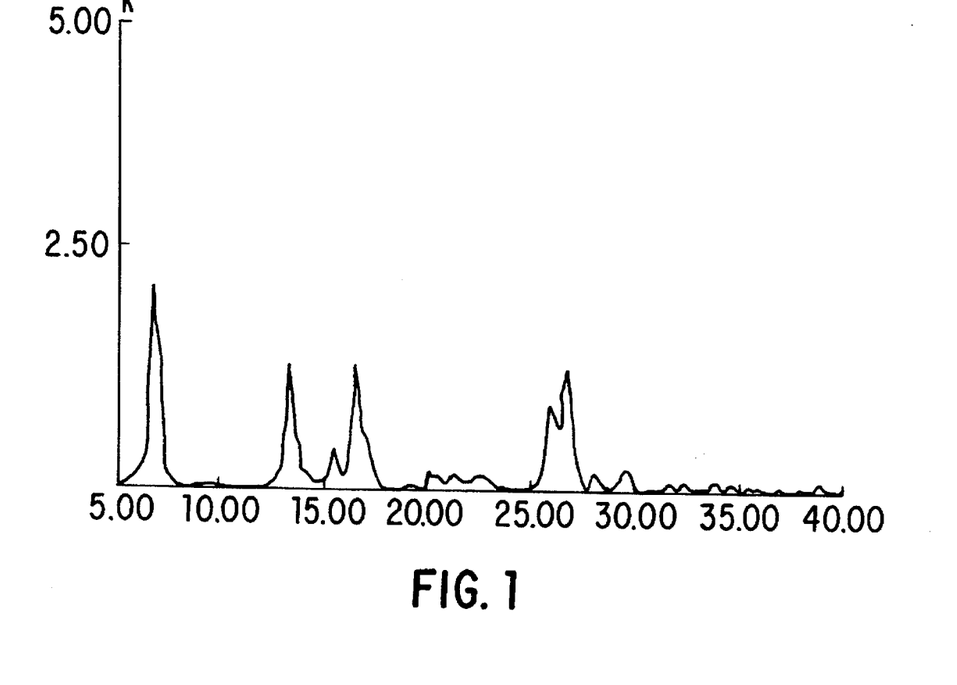
FIG. 1 is a powder X-ray diffraction pattern of hydroxygallium phthalocyanine crystals obtained in Synthesis Example 1.

2 parts of the obtained chlorogallium phthalocyanine was dissolved in 50 parts of conc. sulfuric acid, stirred for two hours, and added dropwise into a mixed solution of 75 ml of ice-cooled distilled water, 75 ml of conc. ammonia aqueous solution and 450 ml of dichloromethane to separate out crystals. The separated crystals were washed with distilled water sufficiently and dried to obtain 1.8 parts of hydroxygallium phthalocyanine crystals. The powder X-ray diffraction spectrum of the crystals was the same as shown in FIG. 1.

Synthesis Example 3

The same process as that in Synthesis Example 1 was repeated, except that 450 ml of acetone was used in place of 150 ml of dichloromethane used in Synthesis Example 1, to obtain 1.8 parts of hydroxygallium phthalocyanine crystals. The powder X-ray diffraction spectrum was the same as shown in FIG. 1.

Synthesis Example 4

The same process as that in Synthesis Example 3 was repeated to obtain another hydroxygallium phthalocyanine crystals so as to examine the scattering of the characteristics of the obtained hydroxygallium phthalocyanine crystals. The powder X-ray diffraction spectrum of the obtained crystals was the same as shown in FIG. 1.

Comparative Synthesis Example 1

Figure 2:
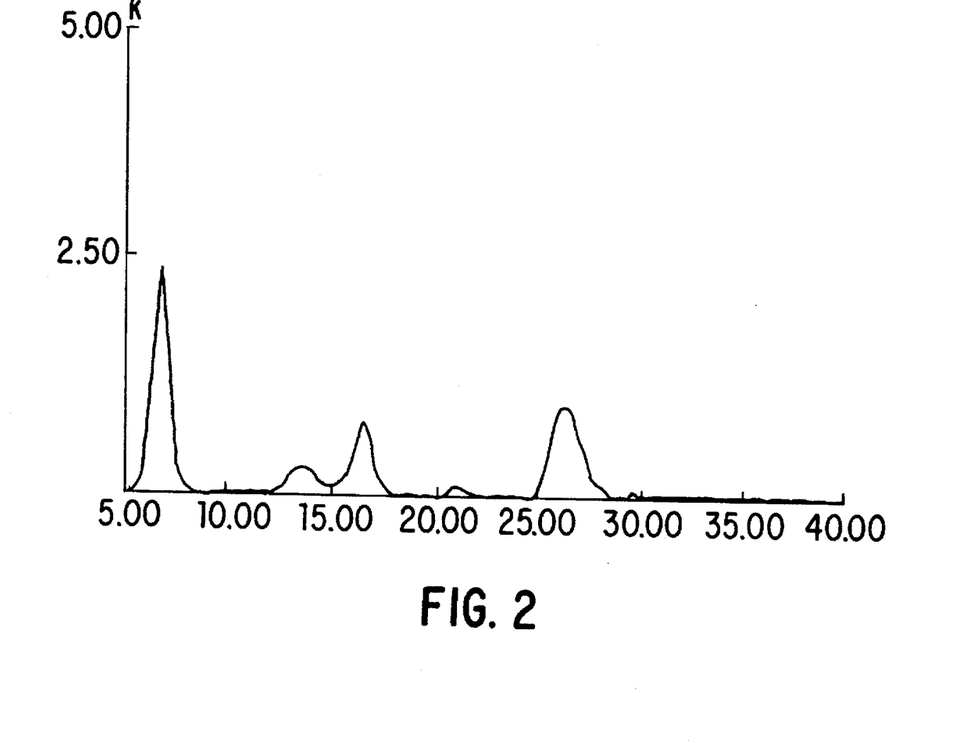
FIG. 2 is a powder X-ray diffraction pattern of hydroxygallium phthalocyanine crystals obtained in Comparative Synthesis Example 1.

2 parts of chlorogallium phthalocyanine obtained in the same manner as in Synthesis Example 2 was dissolved in 50 parts of conc. sulfuric acid, stirred for two hours, and added dropwise into a mixed solution of 174 ml of ice-cooled distilled water and 66 ml of conc. ammonia aqueous solution to separate out crystals. The crystals separated was washed with distilled water sufficiently and dried to obtain 1.8 parts of hydroxygallium phthalocyanine crystals. The powder X-ray diffraction spectrum of the crystals was shown in FIG. 2.

Comparative Synthesis Example 2

The same process as that in Comparative Synthesis Example 1 was repeated to obtain another hydroxygallium phthalocyanine crystals so as to examine the scattering of the characteristics of the obtained hydroxygallium phthalocyanine crystals.

EXAMPLES 1 TO 4

Figure 3:
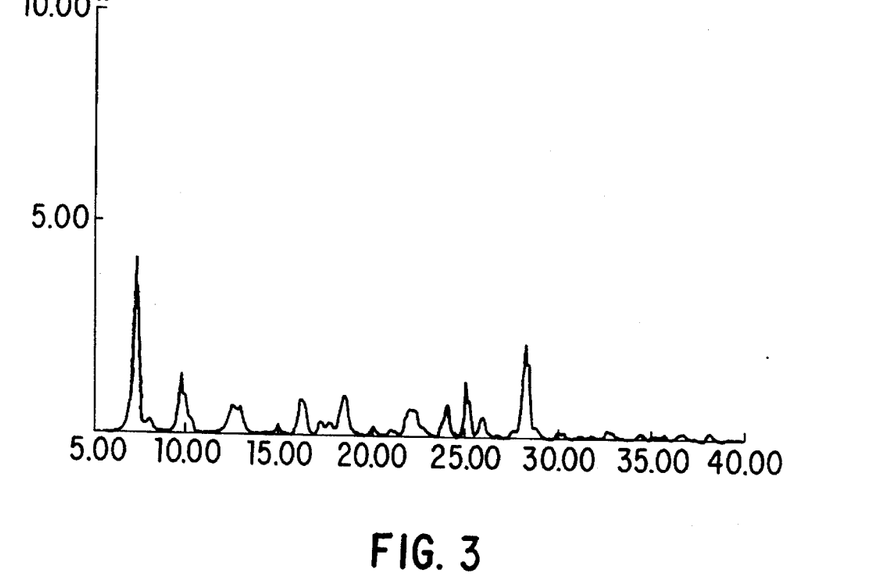
FIG. 3 is a powder X-ray diffraction pattern of hydroxygallium phthalocyanine crystals obtained in Example 1.

1 part of the hydroxygallium phthalocyanine crystals as obtained in Synthesis Examples 1 to 4 were milled along with 15 parts of N,N,-dimethylformamide and 30 parts of 1 mm-diameter glass beads for 24 hours, and the milled crystals were separated. The crystals were washed with n-butyl acetate and dried to obtain 0.9 part of hydroxygallium phthalocyanine crystals respectively. The powder X-ray diffraction pattern of the crystals was the same as shown in FIG. 3.

Comparative Example 1

1 part of the hydroxygallium phthalocyanine crystals as obtained in Comparative Synthesis Example 1 were milled along with 15 parts of N,N,-dimethylformamide and 30 parts of 1 mm-diameter glass beads for 24 hours, and the milled crystals were separated. The crystals were washed with n-butyl acetate and dried to obtain 0.9 part of hydroxygallium phthalocyanine crystals respectively. The powder X-ray diffraction pattern of the crystals was the same as shown in FIG. 3.

Comparative Example 2

The same process as that in Comparative Example 2 was repeated, except that the hydroxygallium phthalocyanine crystals as obtained in Comparative Synthesis Example 2 were used to obtain 0.9 part of hydroxygallium phthalocyanine crystals. The powder X-ray diffraction pattern of the crystals was the same as shown in FIG. 3.

EXAMPLES 5 TO 7

Figure 4:
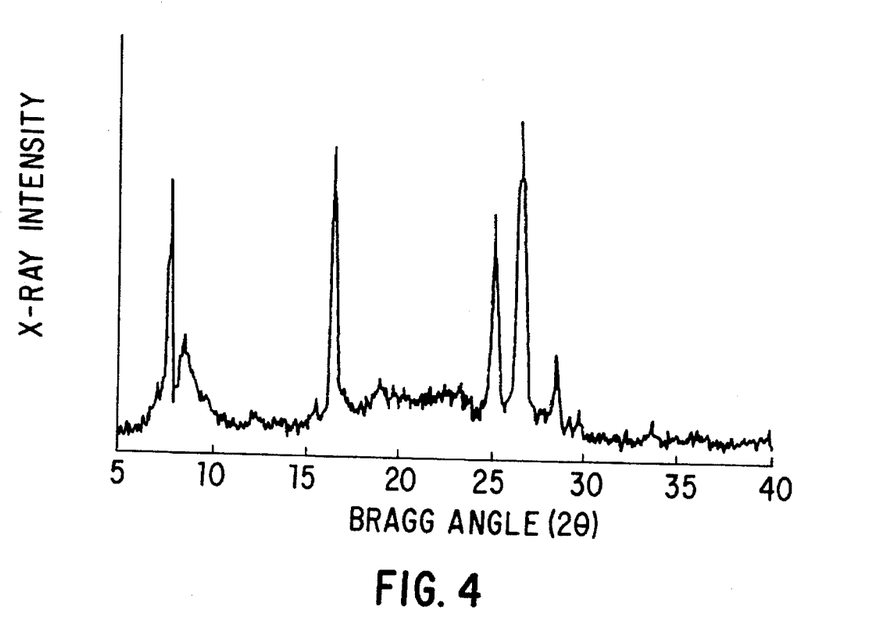
FIG. 4 is a powder X-ray diffraction pattern of hydroxygallium phthalocyanine crystals obtained in Example 5.
Figure 5:
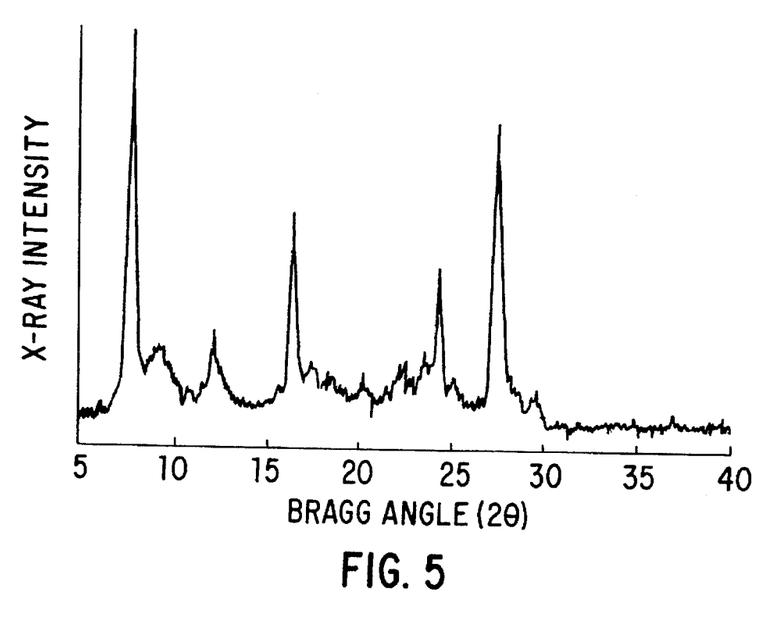
FIG. 5 is a powder X-ray diffraction pattern of hydroxygallium phthalocyanine crystals obtained in Example 6.
Figure 6:
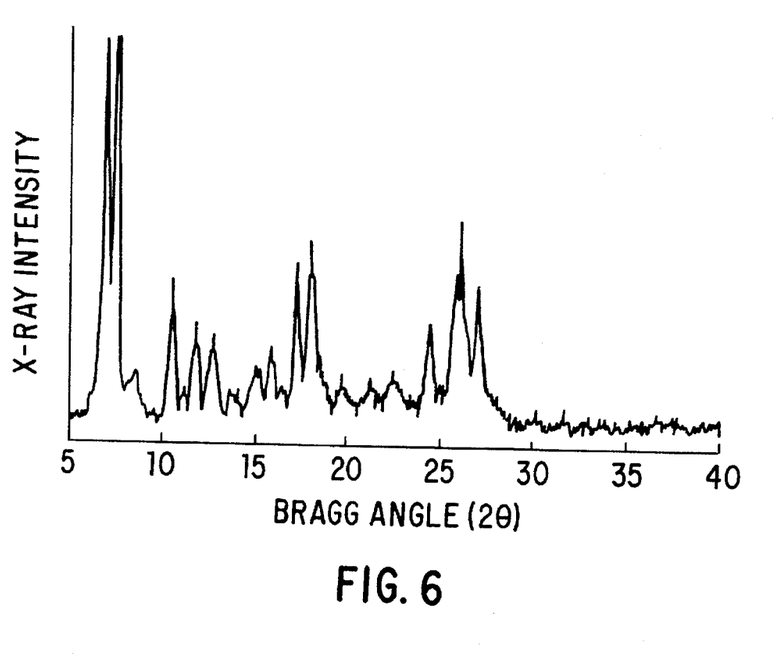
FIG. 6 is a powder X-ray diffraction pattern of hydroxygallium phthalocyanine crystals obtained in Example 7.

0.5 part of the hydroxygallium phthalocyanine crystals as obtained in Synthesis Example 3 were milled along with 15 parts of each solvent shown in Table 1 and 30 parts of 1 mm-diameter glass beads for 24 hours, and the milled crystals were separated. The crystals were washed with methanol and dried to obtain 0.4 part of hydroxygallium phthalocyanine crystals respectively. The powder X-ray diffraction patterns of the crystals were shown in FIGS. 4 to 6.

TABLE 1

| Example | Hydroxygallium phthalocyanine used | Solvent | X-ray diffraction pattern |
| --- | --- | --- | --- |
| Ex. 5 | Syn. Ex. 3 | methanol | FIG. 4 |
| Ex. 6 | Syn. Ex. 3 | dimethylsulfoxide | FIG. 5 |
| Ex. 7 | Syn. Ex. 3 | benzylalcohol | FIG. 6 |

EXAMPLE 8

Figure 7:
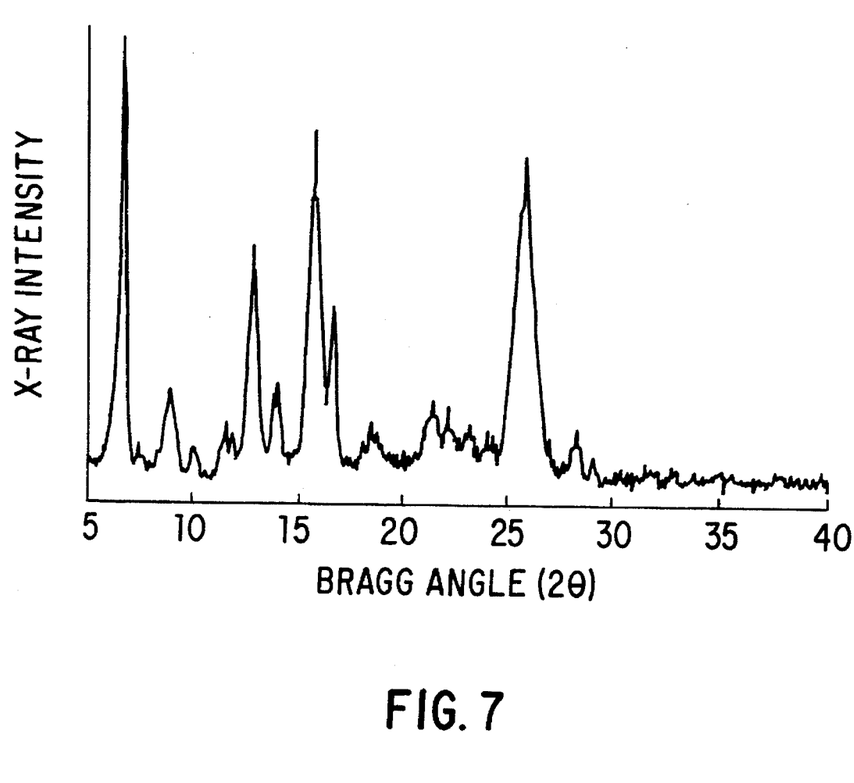
FIG. 7 is a powder X-ray diffraction pattern of hydroxygallium phthalocyanine crystals obtained in Example 8.

0.5 part of the hydroxygallium phthalocyanine crystals as obtained in Synthesis EXAmple 3 were added to 5 parts of ethylene glycol and stirred at 100° C. for 7 hours, and the crystals were separated. The crystals were then washed with methanol and dried to obtain 0.4 part of hydroxygallium phthalocyanine crystals. The powder X-ray diffraction pattern of the crystals was shown in FIG. 7.

EXAMPLES 9 TO 12

A solution composed of 10 parts of a zirconium compound (Orgatics ZC540, produced by Matsumoto Pharmaceutical Co.), 1 part of a silane compound (A1110, produced by Nippon Unicar Co.), 40 parts of i-propanol and 20 parts of butanol was coated on an aluminium support by a dip coating method and dried under heat at 150° C. for 10 minutes to form a subbing layer having a thickness of 0.1 μm.

One part of the each hydroxygallium phthalocyanine crystals as obtained in Examples 1 to 4 was mixed with 1 part of polyvinyl butyral (S-Lec BM-S, produced by Sekisui Chemical Co.) and 100 parts of n-butyl acetate and treated in a paint shaker along with glass beads for one hour so that the crystals were dispersed in the solution. The coating composition thus obtained was coated over the subbing layer by a dip coating method and dried at 100° C. for 10 minutes to form thereon a charge generating layer having a thickness of 0.2 μm.

2 parts of the charge transporting material of formula (1) and 3 parts of polycarbonate having the repeated of formula (2) were dissolved in 20 parts of chlorobenzene, and the coating composition thus obtained was coated over the charge generating layer formed on the aluminium substrate by a dip coating method and dried under heat at 120° C. for one hour to from thereon a charge transporting layer having a thickness of 20 μm.

The electrophotographic photoreceptor thus prepared was examined with respect to the electrophotographic characteristics in the manner mentioned below.

The electrophotographic photoreceptor was subjected to corona discharging of −2.5 μA so as to be charged at a initial surface potential $V_o$ (V) under a normal temperature and normal humidity condition (20° C., 40% RH) using a flat plate scanner. After leaving to stand for one second, $V_{DDP}$ (V) was measured and dark damping factor DDR(%) (DDR=100($V_o$-$V_{DDP}$)/$V_o$) were calculated. Then a 780-nm monochromatic light as derived from a tungsten lamp with a monochrometer was irradiated to the photoreceptor, the irradiated intensity being adjusted to be 0.25 μW/cm² on the surface of the photoreceptor and the initial sensitivity dV/dE (v·cm²/erg) was determined. The results are shown in Table 2.

Comparative Examples 3 and 4

An electrophotographic photoreceptor was prepared in the same manner as described in Example 8, except that the hydroxygallium phthalocyanine crystals obtained in Comparative Examples 1 and 2 were used. This was examined to determine the electrophotographic characteristics in the same manner as described above, and the results obtained are shown in Table 2.

TABLE 2

| Example | Hydroxygallium phthalocyanine used | $V_O$ (V) | $V_{DDP}$ (V) | DDR (%) | dV/dE (V·cm²/erg) |
|---|---|---|---|---|---|
| Ex. 9 | Ex. 1 | −833 | −731 | 12.2 | 375 |
| Ex. 10 | Ex. 2 | −819 | −721 | 12.0 | 375 |
| Ex. 11 | Ex. 3 | −856 | −746 | 12.9 | 386 |
| Ex. 12 | Ex. 4 | −832 | −740 | 11.1 | 379 |
| Com. Ex. 3 | Com. Ex. 1 | −735 | −662 | 10.0 | 388 |
| Com. Ex. 4 | Com. Ex. 2 | −535 | −439 | 17.9 | 309 |

The hydroxygallium phthalocyanine crystals obtained by the present invention may be used as photoconductive materials for electrophotographic photoreceptors having a high light-sensitivity. The electrophotographic photoreceptors have uniform charge retentiveness, dark damping factor and light sensitivity and show stable electrophotographic characteristics and excellent image characteristics in printers of using semi-conductor lasers.

While the invention has been described in detail and with reference to specific embodiment thereof, it will be apparent to one skilled in the art that various changes and modifications can be made therein without departing from the spirit and scope thereof.

What is claimed is:

1. A method for preparing hydroxygallium phthalocyanine crystals comprising contacting starting material hydroxygallium phthalocyanine crystals having distinct diffraction peaks at 7.0°, 13.4°, 16.6°, 26.0° and 26.7° of the Bragg angle (2θ±0.2°) with respect to CuKα characteristic X-ray in the X-ray diffraction spectrum with a solvent to transfer said crystals into a different crystalline form.

2. A method for preparing hydroxygallium phthalocyanine crystals as claimed in claim 1, wherein the crystals after crystal transfer have distinct diffraction peaks at 7.7°, 16.5°, 25.1° and 26.6° of the Bragg angle (2θ±0.2° C.) with respect to CuKα characteristic X-ray in the X-ray diffraction spectrum.

3. A method for preparing hydroxygallium phthalocyanine crystals as claimed in claim 1, wherein the crystals after crystal transfer have distinct diffraction peaks at 7.9°, 16.5°, 24.4° and 27.6° of the Bragg angle (2θ±0.2° C.) with respect to CuKα characteristic X-ray in the X-ray diffraction spectrum.

4. A method for preparing hydroxygallium phthalocyanine crystals as claimed in claim 1, wherein the crystals after crystal transfer have distinct diffraction peaks at 7.0°, 7.5°, 10.5°, 11.7°, 12.7°, 17.3°, 18.1°, 24.5°, 26.2° and 27.1° of the Bragg angle (2θ±0.2° C.) with respect to CuKα characteristic X-ray in the X-ray diffraction spectrum.

5. A method for preparing hydroxygallium phthalocyanine crystals as claimed in claim 1, wherein the crystals after crystal transfer have distinct diffraction peaks at 7.5°, 9.9°, 12.5°, 16.3°, 18.6°, 25.1° and 28.3° of the Bragg angle (2θ±0.2° C.) with respect to CuKα characteristic X-ray in the X-ray diffraction spectrum.

6. A method for preparing hydroxygallium phthalocyanine crystals as claimed in claim 1, wherein the crystals after crystal transfer have distinct diffraction peaks at 6.8°, 12.8°, 15.8° and 26.0° of the Bragg angle (2θ±0.2° C.) with respect to CuKα characteristic X-ray in the X-ray diffraction spectrum.

7. A method of preparing hydroxygallium phthalocyanine crystals as claimed in claim 2, wherein the solvent comprises at least one solvent selected from the group consisting of alcohols, polyhydric alcohols, sulfoxides, aromatic compounds and mixtures thereof.

8. A method for preparing hydroxygallium phthalocyanine crystals as claimed in claim 3, wherein the solvent comprises at least one solvent selected from the group consisting of amides, organic amines, sulfoxides and mixtures thereof.

9. A method for preparing hydroxygallium phthalocyanine crystals as claimed in claim 4, wherein the solvent comprises aromatic alcohols.

10. A method for preparing hydroxygallium phthalocyanine crystals as claimed in claim 5, wherein the solvent comprises at least one solvent selected from the group consisting of amides, esters, ketones and mixtures thereof.

11. A method for preparing hydroxygallium phthalocyanine crystals as claimed in claim 6, wherein the solvent comprises polyols.

12. A method for preparing hydroxygallium phthalocyanine crystals as claimed in claim 1, wherein said contacting comprises recrystallizing, washing, wet-grinding, dipping, suspending or stirring.

13. A method for preparing hydroxygallium phthalocyanine crystals as claimed in claim 1, wherein said starting material hydroxygallium phthalocyanine crystals are formed by contacting an organic solvent with an aqueous solution of gallium phthalocyanine.

14. A method for preparing hydroxygallium phthalocyanine crystals as claimed in claim 14, wherein said organic solvent is selected from the group consisting of alcohols, glycols, ketones, esters, hydrocarbon halides and aromatic hydrocarbons.

* * * * *